(12) United States Patent
Brown

(10) Patent No.: US 9,821,614 B1
(45) Date of Patent: Nov. 21, 2017

(54) TIRE PRESSURE SENSOR MOUNTING SYSTEM

(71) Applicant: Howard Brown, Rosedale Queens, NY (US)

(72) Inventor: Howard Brown, Rosedale Queens, NY (US)

( * ) Notice: Subject to any disclaimer, the term of this patent is extended or adjusted under 35 U.S.C. 154(b) by 323 days.

(21) Appl. No.: 14/692,578

(22) Filed: Apr. 21, 2015

(51) Int. Cl.
*G01M 17/02* (2006.01)
*B60C 23/04* (2006.01)
*B60C 23/20* (2006.01)
*G01L 17/00* (2006.01)

(52) U.S. Cl.
CPC .......... *B60C 23/0498* (2013.01); *B60C 23/20* (2013.01); *G01L 17/005* (2013.01); *G01M 17/02* (2013.01)

(58) Field of Classification Search
CPC ..... B60C 23/0498; B60C 23/20; B60C 23/04; G01L 17/005; G01M 17/02
See application file for complete search history.

(56) References Cited

U.S. PATENT DOCUMENTS

| | | | |
|---|---|---|---|
| 2,652,858 A | 9/1953 | Snyder | |
| 3,101,529 A | 8/1963 | Burrough | |
| 6,574,843 B1 | 6/2003 | Meadows | |
| 6,805,000 B1 | 10/2004 | Sheikh-Bahaie | |
| 7,021,133 B1 | 4/2006 | Hsu | |
| 7,034,672 B2 | 4/2006 | Dinello et al. | |
| 7,091,840 B2 | 8/2006 | Ichinose | |
| 7,168,305 B2* | 1/2007 | Narayanaswamy | B60C 23/0408 73/146 |
| 7,281,421 B2 | 10/2007 | Yin et al. | |
| 7,656,281 B2 | 2/2010 | Zhou | |
| 8,096,175 B2 | 1/2012 | Uh et al. | |
| D653,567 S | 2/2012 | Yamada | |
| 8,776,589 B1 | 7/2014 | Brown | |
| 2002/0148286 A1* | 10/2002 | Losey | B60C 23/0408 73/146 |
| 2004/0118195 A1* | 6/2004 | Nespo | B60C 23/0408 73/146 |
| 2006/0243043 A1 | 11/2006 | Breed | |
| 2006/0248947 A1* | 11/2006 | Phalak | B60C 23/0498 73/146 |
| 2008/0018445 A1* | 1/2008 | Shimura | B60C 23/0408 340/442 |
| 2011/0000293 A1 | 1/2011 | Luce | |
| 2011/0043343 A1 | 2/2011 | Shepler et al. | |
| 2011/0043354 A1 | 2/2011 | Shepler et al. | |
| 2011/0296907 A1 | 12/2011 | Luce | |

* cited by examiner

*Primary Examiner* — Paul West
*Assistant Examiner* — Xin Zhong

(57) ABSTRACT

A tire pressure sensor mounting system for mounting a tire pressure sensor directly to a wheel rim. A mounting base is disposed on the wheel rim. A linear rim strap groove is disposed across a top surface of the mounting base. A plurality of side strap through-slots is transversely disposed through the side surfaces of the mounting base. A portion of a rim strap is disposed in the rim strap groove. A first locking mechanism tightly encloses the rim strap around the wheel rim to secure the mounting base on the wheel rim. A portion of a side strap is disposed through the side strap through-slot. A second locking mechanism locks the side strap around the tire pressure sensor to secure the tire pressure sensor on the mounting base.

1 Claim, 5 Drawing Sheets

TIRE PRESSURE SENSOR MOUNTING SYSTEM

FIELD OF THE INVENTION

The present invention relates to a tire pressure sensor mounting system, in particular, a tire pressure sensor mounting system for mounting a tire pressure sensor directly on a wheel rim.

BACKGROUND OF THE INVENTION

Car accidents caused by under-inflated tires led to government legislation requiring that passenger cars be equipped with a tire pressure monitoring system (TPMS). For example, multiple deaths that occurred from rollovers due to tire failure of Firestone tires led to the Firestone recall, which pushed the United States Congress to pass the Transportation Recall Enhancement, Accountability and Documentation (TREAD) Act. This Act mandated the use of a TPMS technology to help alert drivers of under-inflation events.

TPMS technology can be divided into direct and indirect systems. Indirect systems have been largely regarded as inaccurate due to their methods of measuring air pressures by monitoring individual wheel rotational speeds and other signals available outside of the tire itself. Direct systems are preferable over indirect systems because of their better accuracy in monitoring tire pressures.

Direct TPMS utilizes physical pressure sensors on each tire, either internally or externally. The sensors measure the tire pressure in each tire and report it to the vehicle's instrument cluster or a corresponding monitor. Some sensors are also capable of measuring the temperature inside the tire. These sensors can identify under-inflation in any combination, of one tire or all four, simultaneously. A typical pressure sensor is connected to a tire valve. However, when the valve breaks, the sensor would normally have to be replaced. Replacement of the pressure sensor is expensive and time-consuming since a new sensor would need to be reprogrammed. Hence there is a need for a system that allows the tire pressure sensor to be mounted more conveniently.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a tire pressure sensor mounting system for mounting a tire pressure sensor directly to a wheel rim. The system comprises a tire pressure sensor, a wheel rim, and a tire pressure sensor mounting apparatus. The tire pressure sensor mounting apparatus may comprise a mounting base, at least one rim strap, and at least one side strap. The rim strap attaches the mounting base to the wheel rim and the side strap attaches the tire pressure sensor to the mounting base.

DESCRIPTION OF PREFERRED EMBODIMENTS

Figure 1:
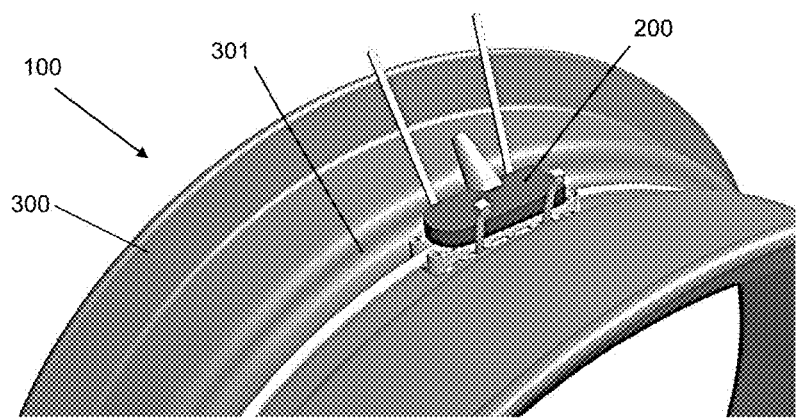
FIG. 1 shows a perspective view of the present invention.
Figure 2:
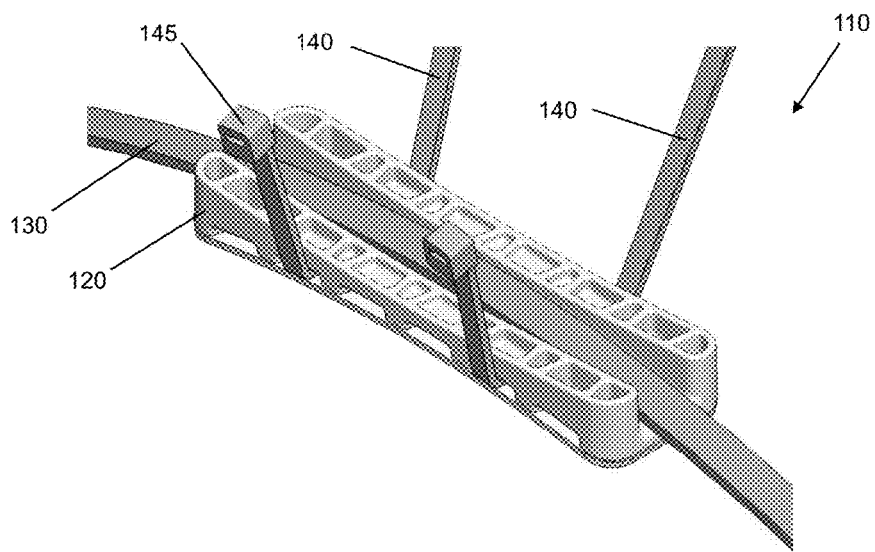
FIG. 2 shows an in-use view of the present invention.
Figure 3:
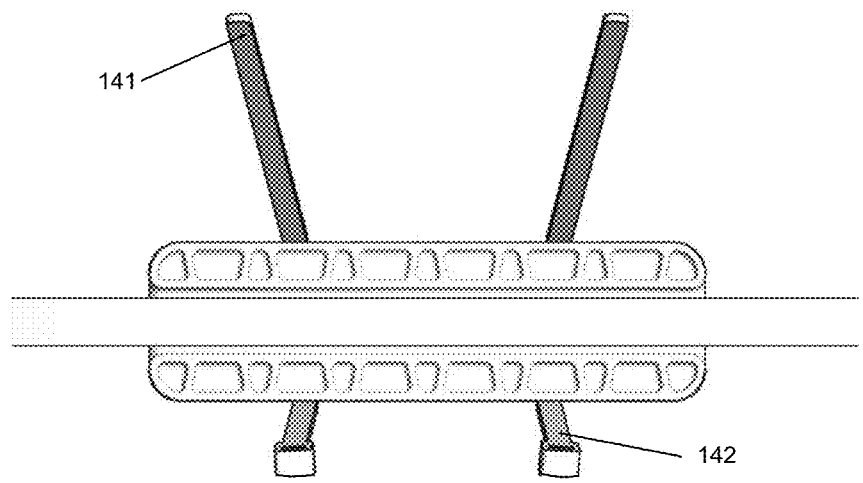
FIG. 3 shows a top view of the present invention.
Figure 4:
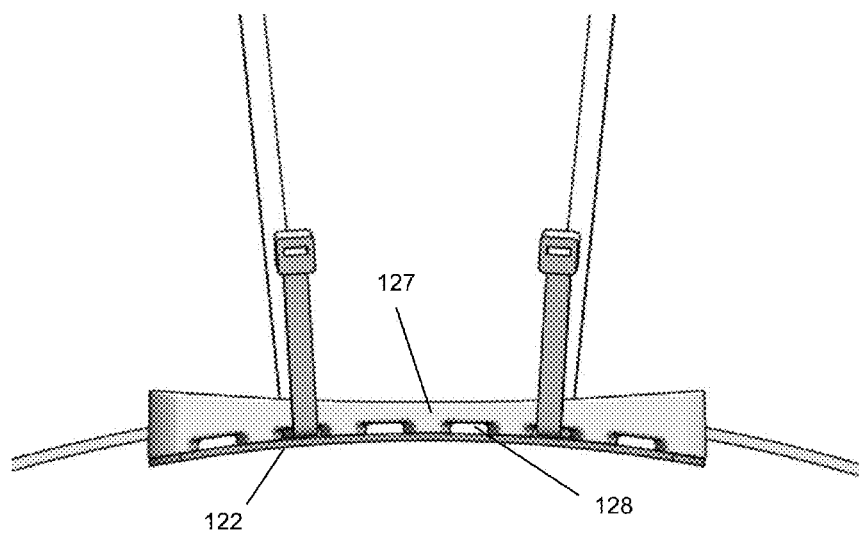
FIG. 4 shows a front view of the present invention.
Figure 5:
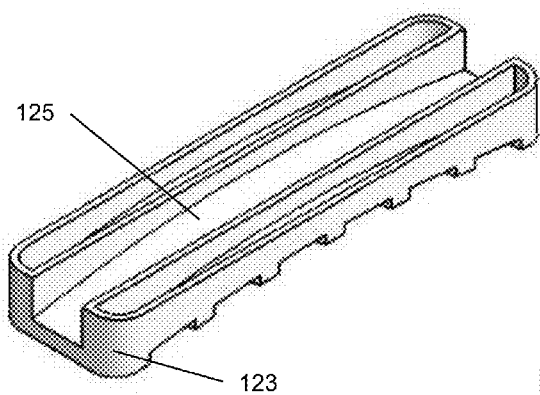
FIG. 5 shows a perspective view of a component of the present invention.
Figure 6:
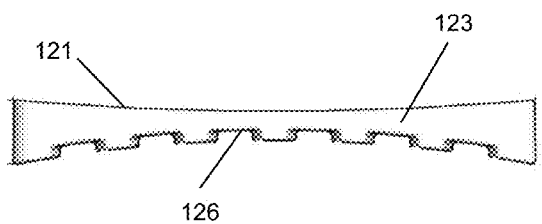
FIG. 6 shows a side view of the present invention.
Figure 7:
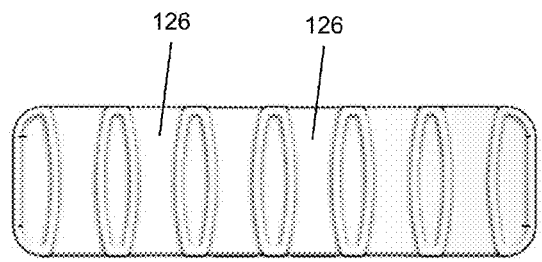
FIG. 7 shows a bottom view of a component of the present invention.
Figure 8:
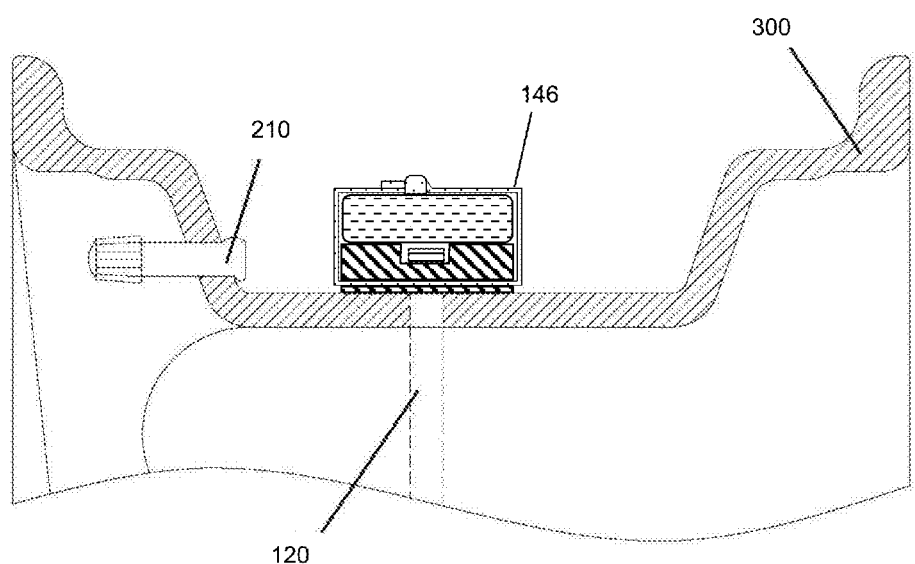
FIG. 8 shows a cross-sectional view of FIG. 1.
Figure 9:
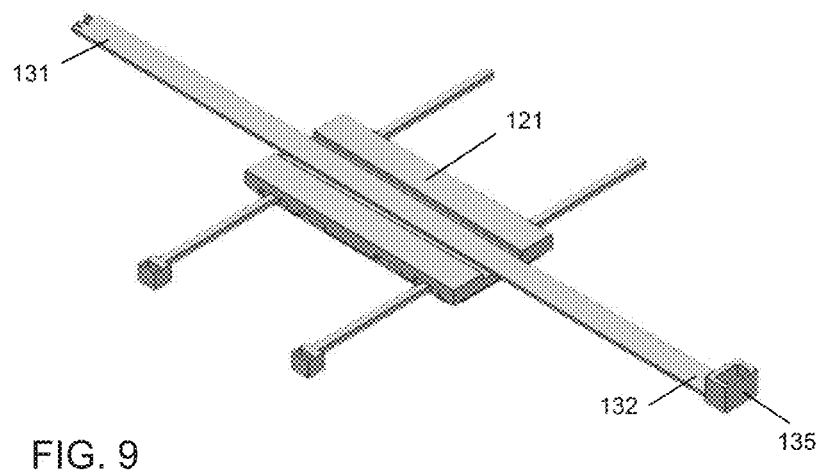
FIG. 9 shows an alternative embodiment of the present invention.
Figure 10:
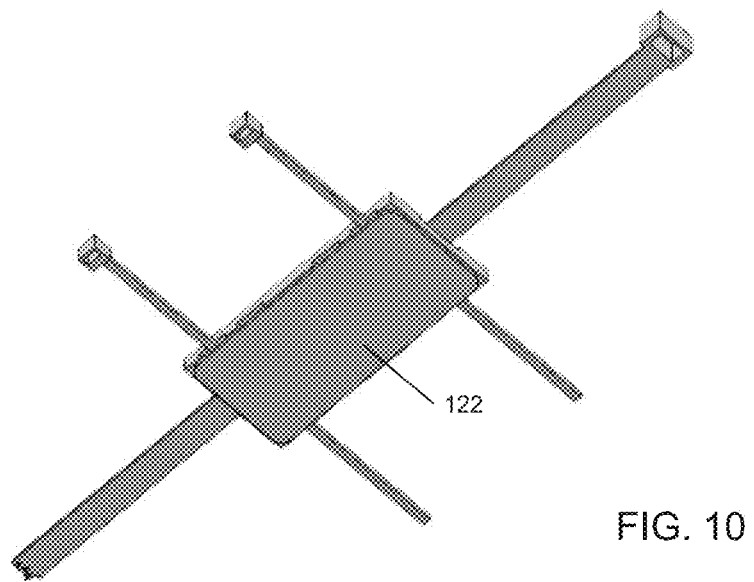
FIG. 10 shows an alternative embodiment the present invention.

Following is a list of elements corresponding to a particular element referred to herein:
100 tire pressure sensor mounting system
110 tire pressure sensor mounting apparatus
120 mounting base
121 top surface
122 bottom surface
123 side surface
125 rim strap groove
126 side strap through-slot
127 medial portion
128 opening
130 rim strap
131 rim strap first end
132 rim strap second end
135 first locking mechanism
140 side strap
141 side strap first end
142 side strap second end
145 second locking mechanism
146 side strap loop
200 tire pressure sensor
210 tire valve
300 wheel rim
301 outer surface Referring now to FIG. 1-10, the present invention features a tire pressure sensor mounting system (100) for mounting a tire pressure sensor (200) directly to a wheel rim (300). The system (100) comprises a tire pressure sensor (200), a wheel rim (300), and a tire pressure sensor mounting apparatus (110).

Preferably, the tire pressure sensor (200) is mechanically disconnected from a tire valve (210), i.e. the sensor (200) and the tire valve (210) are completely separate components. Furthermore, the tire pressure sensor (200) may be operatively coupled to a corresponding tire pressure monitor that electronically receives a tire pressure reading in a tire. An indicator light is activated is the tire is at a low tire pressure.

In some embodiments, the tire pressure sensor mounting apparatus (110) comprises a mounting base (120), at least one rim strap (130), and at least one side strap (140). The mounting base (120) may have a top surface (121), a bottom surface (122), and side surfaces (123). The mounting base (120) may be disposed on the wheel rim (300) such that the bottom surface (122) is placed against an outer surface (301) of the wheel rim (300).

In some embodiments, a layer may be disposed on the bottom surface to prevent the bottom surface from slipping or moving away from the outer surface of the wheel rim. The layer can be an adhesive layer, a cloth layer, a thin rubber layer, or any layer that creates sufficient friction between the bottom surface and the outer surface. Moreover, the layer may cushion the mounting base from the wheel rim to prevent the mounting base from vibrating against the outer surface.

In some embodiments, at least one linear rim strap groove (125) is disposed across the top surface (121) of the mounting base (120). The rim strap groove may be parallel to outer rim portion of the wheel rim. In alternative embodiments, the mounting base may have two rim strap grooves (125) to accommodate for two rim straps. The pair of rim strap grooves may be parallel to each other and disposed across the top surface.

In some embodiments, a plurality of side strap through-slots (126) is transversely disposed through the side surfaces (123) of the mounting base (120). For example, the side strap through-slots may be disposed through the mounting base such that a first opening of each through-slot is disposed on a first side surface and a second opening of each through-slot is disposed on a second side surface opposite the first side surface. Each through-slot may be formed by an inner channel connecting the first opening to the second opening. Each side strap through-slot is preferably parallel to and adjacent to another side strap though-slot. It is also preferable that the side strap through-slots (126) are perpendicular to the rim strap groove (125). In some embodiments, the plurality of side strap through-slots (126) may comprise between about 2 to 8 through-slots.

In some embodiments, at least one rim strap (130) may comprise a rim strap first end (131), a rim strap second end (132), and a first locking mechanism (135) disposed on the rim strap second end (132). A portion of the rim strap is disposed in the rim strap groove (125) of the mounting base (120). In some embodiments, the first locking mechanism (135) locks the rim strap first end (131) to tightly enclose the rim strap (130) around the wheel rim (300) and secure the mounting base (120) to the wheel rim (300). In other embodiments, the tire pressure sensor mounting apparatus (110) comprises two or more rim straps.

In some embodiments, at least one side strap (140) may comprise a side strap first end (141), a side strap second end (142), and a second locking mechanism (145) disposed on the side strap second end (142). A portion of the side strap is disposed through the side strap through-slot (126) of the mounting base (120). Preferably, only one side strap is disposed through one side strap through-slot. In other embodiments, the tire pressure sensor mounting apparatus (110) may comprise at least two, three, or four side straps.

In preferred embodiments, the tire pressure sensor (200) is disposed on the top surface (121) of the mounting base (120). The second locking mechanism (145) locks the side strap first end (141) to form a side strap loop (146) tightly around the tire pressure sensor (200) disposed on the mounting base (120) such that the side strap loop (146) securely holds the tire pressure sensor (200) to the mounting base (120).

In some embodiments, the mounting base (120) is rectangular in shape. In other embodiments, the mounting base (120) is polygonal in shape. In still other embodiments, the mounting base (120) is circular or oval in shape.

In some embodiments, the bottom surface (122) of the mounting base (120) is curved such that a curvature of the bottom surface (122) is similar to a curvature of the wheel rim (300). In some embodiments, the top surface (121) of the mounting base (120) is curved. For example, the top surface (121) of the mounting base (120) is concavely curved. In other embodiments, the top surface (121) and the bottom surface (122) of the mounting base (120) are curved such that the mounting base (120) is tapered when viewed from the side surface.

In some embodiments, the rim strap groove (125) of the mounting base (120) is curved such that a curvature of the rim strap groove (125) is similar to a curvature of the wheel rim (300).

In some embodiments, each side strap through-slot (126) is narrower (i.e. tapered) at a medial portion (127) than at the opening (128) of each side strap through-slot (126). For example, the side strap through-slot may be in the shape of an hour glass. In one embodiment, the plurality of side strap through-slots (126) may be disposed near the bottom surface (122) of the mounting base (120). In another embodiment, the plurality of side strap through-slots (126) may be disposed near the top surface (121) of the mounting base (120). In another embodiment, the plurality of side strap through-slots (126) may be disposed in between the top surface (121) and the bottom surface (122) of the mounting base (120).

In some embodiments, the mounting base (120) is constructed from rubber, metal, a polymeric material, or a combination thereof. In some embodiments, the rim strap (130) and the side strap (140) are constructed from plastics, nylon, metal or a combination thereof. In other embodiments, at least a part of the rim strap (130) and at least a part of the side strap (140) are elasticized.

In some embodiments, the rim strap first end (131) of the rim strap (130) and the strap first end (141) of the side strap (140) have triangular teeth that slope in one direction, and wherein the first locking mechanism (135) and the second locking mechanism (145) are zip tie locks.

In some embodiments, the rim strap groove (125) of the mounting base (120) has a depth equal to or greater than a depth of the rim strap (130). The depth of the rim strap groove may range from about 0.08 to about 0.30 inch. In some embodiments, the rim strap groove (125) of the mounting base (120) has a width equal to or greater than a width of the rim strap (130). The width of the rim strap groove may range from about 0.40 to about 0.50 inch.

In other embodiments, each side strap through-slot (126) of the mounting base (120) has a depth equal to or greater than a depth of the side strap (140). The depth of each side strap through slot may range from about 0.06 to about 0.08 inch. In other embodiments, each side strap through-slot (126) of the mounting base (120) has a width equal to or greater than a width of the side strap (140). The width of each side strap through-slot may range from about 0.25 to about 0.35 inch.

In other embodiments, the wheel rim (300) has a diameter ranging from between about 13 inches to about 24 inches. The length of the rim strap is preferably greater than the circumference of the wheel rim. For example, the length of the rim strap ranges from about 34 to about 82 inches. In other embodiments, the rim strap has a width ranging from about 0.35 to about 0.45 inches.

In some embodiments, the side strap has a width ranging from about 0.19 to about 0.22 inches. In other embodiments, the side strap has a length ranging from about 6 to about 9 inches.

In some embodiments, the mounting base has a maximum length ranging from about 3.0 to about 4.0 inches. In other embodiments, the mounting base has a maximum width ranging from about 1.0 to about 1.25 inches.

A non-limiting embodiment of the present invention features a tire pressure sensor mounting system (100) for mounting a tire pressure sensor (200) directly to a wheel rim (300). The system (100) comprises the tire pressure sensor (200), the wheel rim (300), and a tire pressure sensor mounting apparatus (110). The tire pressure sensor (200) is mechanically disconnected from a tire valve (210). The tire pressure sensor mounting apparatus (110) comprises a rectangular mounting base (120), a rim strap (130), and a pair of side straps (140). The rectangular mounting base (120) comprises a top surface (121), a bottom surface (122), and side surfaces (123). The mounting base (120) is disposed on the wheel rim (300) such that the bottom surface (122) is placed against an outer surface (301) of the wheel rim (300). A linear rim strap groove (125) is disposed across the top surface (121) and a plurality of side strap through-slots (126) is transversely disposed through opposing side surfaces (123). Thee side strap through-slots (126) are perpendicular to the rim strap groove (125). The rim strap (130) comprises a rim strap first end (131), a rim strap second end (132), and a first locking mechanism (135) disposed on the rim strap second end (132). A portion of the rim strap is disposed in the rim strap groove (125) of the mounting base (120). The first locking mechanism (135) locks the rim strap first end (131) to tightly enclose the rim strap (130) around the wheel rim (300) and secure the mounting base (120) to the wheel rim (300). Each side strap of the pair of side straps (140) has a side strap first end (141), a side strap second end (142), and a second locking mechanism (145) disposed on the side strap second end (142). A portion of each side strap is disposed through one of the side strap through-slots (126). The tire pressure sensor (200) is disposed on the top surface (121) of the mounting base (120). The second locking mechanism (145) locks the side strap first end (141) of each side strap (140) to form a side strap loop (146) tightly around the tire pressure sensor (200) disposed on the mounting base (120) such that each side strap loop (146) securely holds the tire pressure sensor (200) to the mounting base (120).

As used herein, the term "about" refers to plus or minus 10% of the referenced number.

The disclosures of the following US Patents are incorporated in their entirety by reference herein: (1) U.S. Pat. No. 2,652,858; (2) U.S. Pat. No. 3,101,529; (3) U.S. Pat. No. 6,574,853; (4) U.S. Pat. No. 7,021,133; (5) U.S. Pat. No. 7,281,421; (6) U.S. Pat. No. 7,656,281; (7) U.S. Pat. No. 8,096,175; (8) U.S. No. D653,576; and (9) U.S. Pat. No. 8,776,589.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A tire pressure sensor mounting system (100) for mounting a tire pressure sensor (200) directly to a wheel rim (300), said system (100) consisting of:
   a. the tire pressure sensor (200), wherein the tire pressure sensor (200) is mechanically disconnected from a tire valve (210);
   b. the wheel rim (300); and
   c. a tire pressure sensor mounting apparatus (110) consisting of:
      i. a rectangular mounting base (120) consisting of a top surface (121), a bottom surface (122), and side surfaces (123), wherein the mounting base (120) is disposed on the wheel rim (300) such that the bottom surface (122) is placed against an outer surface (301) of the wheel rim (300), wherein a linear rim strap groove (125) is disposed across the top surface (121), wherein a plurality of side strap through-slots (126) is transversely disposed through opposing side surfaces (123), wherein the side strap through-slots (126) are perpendicular to the rim strap groove (125);
      ii. a rim strap (130) consisting of a rim strap first end (131), a rim strap second end (132), and a first locking mechanism (135) disposed on the rim strap second end (132), wherein a portion of the rim strap is disposed in the rim strap groove (125) of the mounting base (120), wherein the first locking mechanism (135) locks the rim strap first end (131) to tightly enclose the rim strap (130) around the wheel rim (300) and secure the mounting base (120) to the wheel rim (300); and
      iii. a pair of side straps (140) each consisting of a side strap first end (141), a side strap second end (142), and a second locking mechanism (145) disposed on the side strap second end (142), wherein a portion of each side strap is disposed through one of the side strap through-slots (126); and
   wherein the tire pressure sensor (200) is disposed on the top surface (121) of the mounting base (120), wherein the second locking mechanism (145) locks the side strap first end (141) of each side strap (140) to form a side strap loop (146) tightly around the tire pressure sensor (200) disposed on the mounting base (120), and wherein each side strap loop (146) securely holds the tire pressure sensor (200) to the mounting base (120).

* * * * *